April 21, 1964

R. E. SLATTERY 3,129,535

METHOD AND APPARATUS FOR GRINDING RAILS

Original Filed April 22, 1959

INVENTOR
ROBERT E. SLATTERY
BY
Mason, Kolehmainen, Rathburn and Wyss
ATTORNEYS.

United States Patent Office 3,129,535
Patented Apr. 21, 1964

3,129,535
METHOD AND APPARATUS FOR
GRINDING RAILS
Robert E. Slattery, Rockford, Ill., assignor to Chemetron Corporation, Chicago, Ill., a corporation of Delaware
Continuation of application Ser. No. 808,200, Apr. 22, 1959. This application Apr. 25, 1962, Ser. No. 193,036
32 Claims. (Cl. 51—140)

The present invention relates to new and improved method and apparatus for use in welding rail sections together to form a continuous rail and is more particularly concerned with a novel grinding method and apparatus for cleaning spaced apart electrode receiving areas of the rail sections prior to feeding the rail sections to the welding apparatus. This application is a continuation of U.S. patent application Serial No. 808,200, filed April 22, 1959, now abandoned.

For a number of years it has been evident that the use of railroad tracks in the form of rail sections welded together to form a continuous strip is particularly desirable because such a construction not only increases the riding comfort of railroad passengers and reduces the shock and vibration to which rail freight is subjected but, at the same time, is substantially trouble free and, hence, requires considerably less maintenance than tracks of the type employing individual rail sections bolted or otherwise secured together. Despite the knowledge of these advantages, however, the use of welded rails has not been widespread due partly to their excessive cost and also to the inordinate amount of time usually required to form the welded joint for the rail sections. More specifically, in order to form an efficient welded joint, it is necessary not only to weld the rail sections together but also to shear off the upset or excess weld metal and/or to grind the rail in order to form smooth surfaces for the rail base and for the running surface adapted to accommodate the wheels of the railroad car. In prior art arrangements, all of these operations have been very time consuming and, hence, both the time required to form the continuous rail and the production costs have been excessive. Moreover, the prior arrangements for welding the rail sections together have also been found to be unsatisfactory in that they result in the production of a large number of unsatisfactory welds which must be corrected by severing the joint and making a new weld. Obviously, the production of improper welds also increases both the time required and the cost of production of the rail.

One of the principal causes for the production of unsatisfactory welds in prior arrangements where electric welding is used has been found to be the inability of the welding electrodes to make proper electrical contact with the surface of the rail sections to be welded together. These poor contacts may arise from the presence of scale or other foreign accumulations collected on the rail section surfaces during storage or, alternatively, they may be caused by the existence of raised or roughened regions on the rail surfaces. Either of these factors cause the electrodes to engage only small points or portions of the rail surfaces and, as a result, the current passing between the electrodes and the rail is concentrated at these points. This current concentration causes burns or pits in the rail surface and may also prevent a uniform distribution of current across the butt ends of the rail sections; a condition which is necessary for the production of a satisfactory weld. The electrode burns are not only unsightly but may also create weakened or stressed areas which will cause rupture of the rail in use and, hence, the existence of such burns may require the weld to be rejected. The ideal condition for producing good welds exists when each welding electrode and its associated rail are in engagement throughout their contiguous surface areas.

In accordance with the present invention this ideal condition is realized by grinding or cleaning the electrode receiving areas of the rail section before it is supplied to the welding apparatus, thereby removing any scale or other accumulations and, at the same time, forming smooth surfaces for engaging relatively large areas of the electrodes. The grinding is accomplished by a pair of fixedly positioned belt type grinders respectively acting upon the top running surface and the underside of the base of the rail section when the latter is advanced past the grinders. Each of the grinders includes a fluid pressure operated roller for urging a driven abrasive belt against the rail section and this roller is rendered effective for brief intervals when the leading edge of the rail section enters the grinding area and again when the trailing edge of the rail section leaves the grinding area, thus rendering the belt effective to grind spaced apart areas of the base and running surface of the rail section located near the opposed ends. The remaining or major portion of the rail section is not ground, thus avoiding excessive wear upon the abrasive belts.

It is, therefore, a primary object of the present invention to provide new and improved apparatus for grinding or cleaning spaced apart portions respectively located near the opposed ends of an elongated workpiece.

Another object of the invention is to provide apparatus for grinding or cleaning spaced apart portions located near the opposed ends of a rail section prior to supplying the rail section to an electric welding apparatus in order to improve the electrical contacts between the welding electrodes and the ground portions of the rail section.

A further object of the invention is to provide apparatus according to the preceding object where portions of the rail section located on the underside of the base and on the top running surface of the rail section are ground only near the leading and trailing edges of the rail section.

It is also an object of the present invention to provide a grinding apparatus of the character indicated above which is automatically rendered effective to perform its grinding operations by movement of the rail section through the apparatus.

The invention has for another object the provision of new and improved mechanism for rendering the grinding or cleaning apparatus effective during spaced apart intervals so that only very small areas of the rail section or workpiece are ground.

A further object of the invention is to provide a new and improved method of grinding or cleaning spaced apart portions of a rail section located near its opposed ends.

The invention both as to its organization and manner of operation together with further objects and advantages will best be understood by reference to the following detailed description taken in conjunction with the accompanying drawings wherein.

Figure 1:
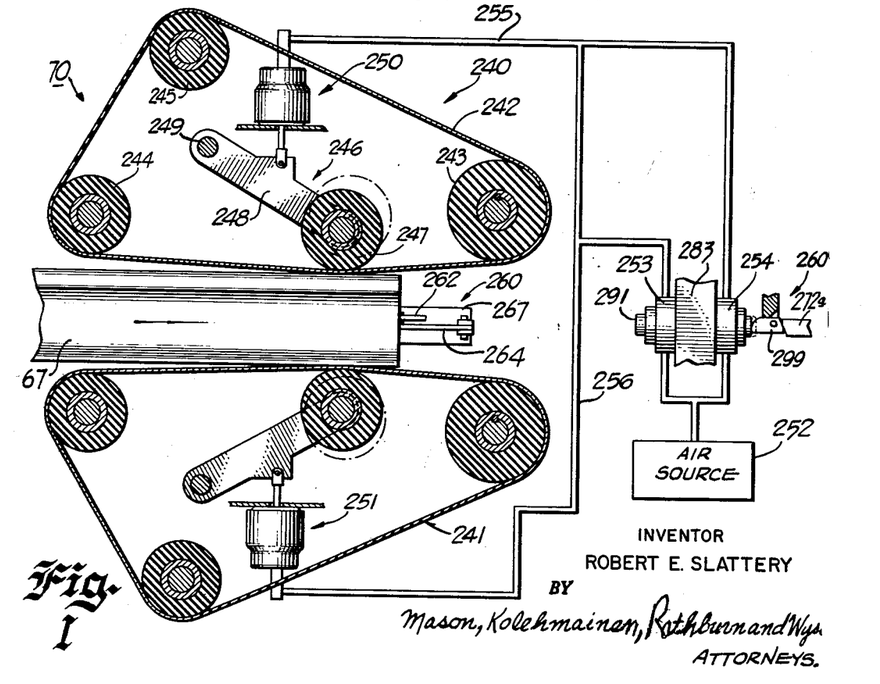
FIG. 1 is a sectional view taken along a line substantially corresponding to line 1—1 in FIG. 5, is shown partly schematic and illustrates the grinding heads of the spot grinding apparatus of the present invention together with the sensing mechanism for rendering these heads effective to grind the rail section during spaced apart intervals.

Referring now to the drawings and more particularly to FIG. 1, the spot grinding apparatus is there illustrated as including a pair of grinding heads 240 and 241 which are respectively adapted to grind the top running surface and the bottom of the base of the rail section along small areas located near the two ends of the rail section. As indicated previously, this grinding action serves to clean those regions of the rail section engaged by the electrodes of the welding apparatus (not shown) in order to enhance the electrical contact. These grinding heads are similar in construction and each includes a flexible abrasive belt 242 trained over three spaced apart rollers 243, 244 and 245. At least one of the three rollers of each set is driven for the purpose of moving the flexible belt in order to perform the grinding operation. The abrasive belt includes a belt run extending adjacent the rail surface to be ground and a portion of this run is adapted to be urged into engagement with the rail section by means of a fluid operated roller assembly 246 which is movable between a de-actuated position indicated by the broken lines in FIG. 1 to an actuated position illustrated in solid lines. The roller assembly 246 includes a roller 247 movable into engagement with the back or non-grinding surface of the belt 242 and mounted upon one end of a roller support structure 248. The roller support structure is mounted for pivotal movement about a pivot pin 249 under the control of a fluid operated piston and cylinder assembly. The piston and cylinder assembly for the grinding head 240 is identified by the reference numeral 250 while a corresponding piston and cylinder assembly for controlling the pivotal movement of the pressure operated roller of the grinding head 241 is identified by the reference numeral 251. These piston and cylinder assemblies may be either of the single acting type or of the double acting type, but in the form illustrated in FIG. 1, they are single acting with their pistons being biased by means of a suitable spring or the like (not shown) to urge the roller assemblies toward their de-energized positions.

The piston and cylinder assemblies 250 and 251 are adapted to be moved to their actuated positions by admission of air or other fluid under pressure delivered from a source 252, this fluid pressure being effective to overcome the action of the biasing springs in order to move the roller assemblies to their actuated positions where they urge the abrasive belt against the rail section. The flow of air under pressure from the source 252 to the piston and cylinder assemblies is controlled by a pair of timed control valves 253 and 254, each of which is of the type which remains open for a predetermined period following its actuation and then closes automatically at the expiration of this period. When the valve 254 is open, air under pressure flows from the source 252 through an air line 255 to the upper end of the piston and cylinder assembly 250 so that the piston rod of this assembly moves downwardly to pivot the support structure 248 in a clockwise direction as viewed in FIG. 1, thereby moving the grinding belt 242 into engagement with the running surface of the rail section. At the same time, the fluid pressure in the line 255 is delivered via line 256 to the lower end of the piston and cylinder assembly 251 in order to move the roller assembly of the grinding head 241 to its actuated position.

As will be described in detail hereinafter, the valve 253 is opened when the leading end of the rail section advances to the spot grinder and this valve remains open for a predetermined period of time while the grinding heads 240 and 241 clean small areas near the leading end of the rail section. At the expiration of this predetermined time, the valve 253 closes automatically to shut off fluid pressure to the piston and cylinder assemblies 250 and 251 whereupon the roller assemblies move to their de-actuated positions and the grinding heads no longer grind the rail section. The roller assemblies remain in their deenergized positions while the rail section advances until the trailing end of the rail section becomes effective in a manner described more fully below to open the valve 253. When the valve 254 is opened, air under pressure from the source 252 again flows through the conduits 255 and 256 to the piston and cylinder assemblies 250 and 251 to move the roller assemblies to their actuated positions in order to force the abrasive belts of both grinding heads against the rail section. The valve 253 is opened in response to movement of the trailing end of the rail section to a point just prior to its emergence from the spot grinder and this valve remains open while the grinding heads 240 and 241 clean small areas of the rail section near its trailing end.

Figure 2:
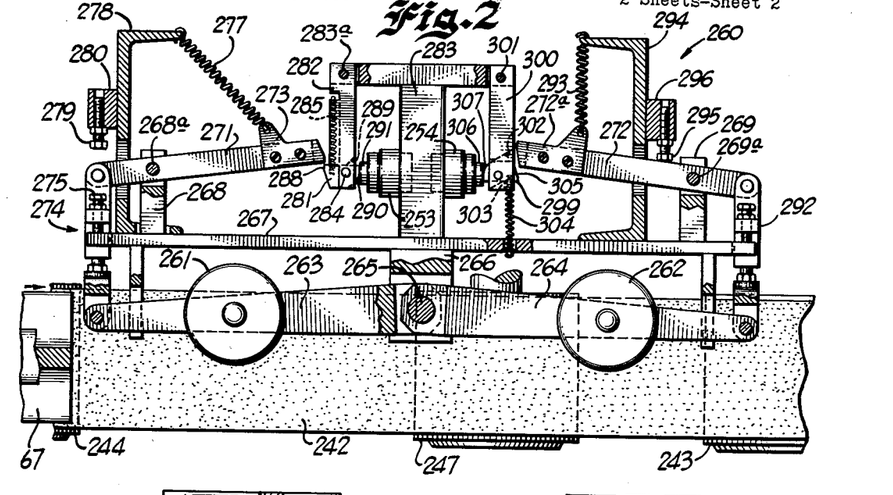
FIG. 2 is a fragmentary view showing the construction of the sensing mechanism in its inoperative condition, that is, in the condition when there is no rail section in the spot grinder.

The sensing mechanism for operating the valves 253 and 254 in response to movement of the rail is best shown in FIGS. 2 to 6 of the drawings where this mechanism is generally identified by reference numeral 260 and includes a pair of rollers 261 and 262 which are adapted to ride upon the web of the rail section in order to sense the movements of the leading and trailing ends of the rail section when the latter is advanced through the spot grinder. The rail section may be moved from left to right, as viewed in FIGS. 1 and 2, through the spot grinding apparatus by any conventional rail moving equipment as, for example, by power driven rollers supporting the rail section and acting upon the underside of the base. To this end, as is best shown in FIG. 2 of the drawings, the rollers 261 and 262 are respectively supported upon arms 263 and 264 mounted for pivotal movement at one end about a pivot pin 265 carried on a fixed bracket 266. The bracket 266 is mounted upon a support base 267 located in fixed position adjacent the path of movement of the rail section as, for example, upon a housing for the spot grinding equipment. The base 267 also carries a pair of forked blocks 268 and 269 mounting pivot pins 268a and 269a, respectively, for supporting valve actuating arms 271 and 272. The arm 271 carries a valve actuating finger 273 at its free end and at its other end is pivotally connected through a linkage 274 to the arm 263. The linkage 274 extends through a slot or notch formed in the end of the base 267 and carries an adjustable stop screw 275 which is adapted to engage the base for the purpose of limiting downward movement of the linkage as viewed in FIG. 2.

Figure 3:
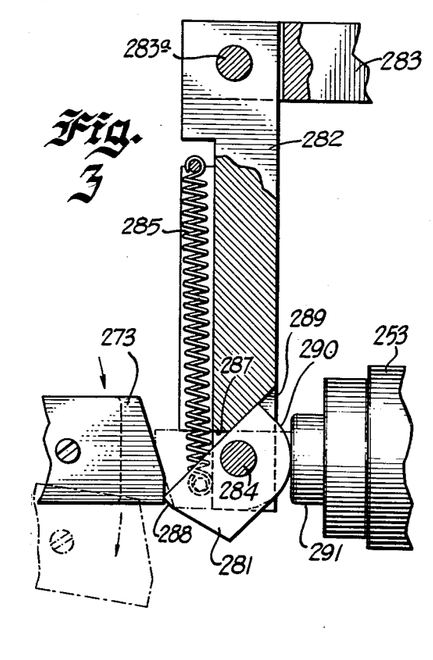
FIG. 3 is a greatly enlarged view partly broken away and showing the valve operating pawls employed in the mechanism illustrated in FIG. 2.
Figure 4:
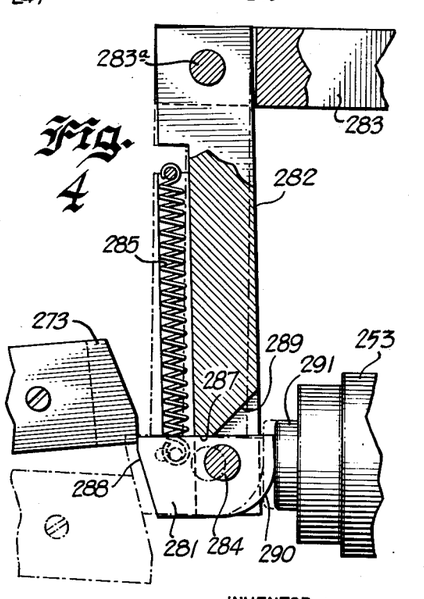
FIG. 4 is a view similar to FIG. 3 but showing the valve operating pawls in a different operating condition.

A biasing spring 277 connected between the valve actuating finger 273 and a support beam 278 fixedly secured to the base 267 normally urges the valve actuating arm 271 to pivot in a counterclockwise direction as viewed in FIG. 2, thereby biasing the roller 261 towards and into the path of movement of the rail section. When the roller 261 is engaged by the leading edge of the rail section as the latter advances, it is moved upwardly as viewed in FIG. 2 against the action of the spring 277 until it reaches the position shown in FIG. 5. When the roller 261 moves upwardly the arm 263 is pivoted about the pivot pin 265 in a clockwise direction, thus raising the linkage 274 and pivoting the arm 271 about the pin 268a in a clockwise direction. The clockwise movement of the arm 271 is limited by an adjustable stop screw 279 which is threaded into a tapped bore formed in a stop block 280 secured to the beam 278. When the valve actuating arm 271 is pivoted in a clockwise direction from the position shown in FIG. 2 to that shown in FIG. 5, the actuating finger 273 engages a pawl 281 pivotally carried upon the lower end of a support arm 282 which is, in turn, mounted for limited pivotal movement about a pin 283a carried upon a support 283 fixedly secured to the base 267. More specifically, the pawl 281 is mounted for pivotal movement about a pin 284 carried by the arm 282 and is normally biased to pivot in a clockwise direction as viewed in FIG. 2 by means of a biasing spring 285 which has one end secured to the pawl 281 and has its other end secured in fixed position upon the arm 282. As is best shown in FIGS. 3 and 4 of the drawings, the clockwise movement of the pawl 281 is limited by engagement of the pawl with a fixed shoulder 287 formed on the arm 282. When the pawl 281 is seated against the shoulder 287, that is, when the pawl is in the broken line position illustrated in FIG. 3, its extreme outer end 288 is disposed in the path of movement of the finger 273. Thus, the above described pivotal movement of the valve actuating arm in a clockwise direction from the position shown in FIG. 2 to that shown in FIG. 5 when the leading end of the rail section advances causes the finger to engage the end of the pawl in order to pivot the latter in a counterclockwise direction, that is, from the broken line position illustrated in FIG. 3 to the solid line position. The counterclockwise pivoting of the pawl 281 is limited by engagement of the pawl with an inclined shoulder 289 formed on the arm 282 and extending upwardly from the shoulder 287. The inner end of the pawl 281 indicated by the reference numeral 290 is arcuate in shape with the center of the arc coinciding with the center of the pivot pin 284. The inner end 290 bears against the outer surface of a push-button 291 for operating the valve 253. The described counterclockwise movement of the pawl 281 in response to clockwise movement of the valve actuating arm 271 has no effect upon the push-button 291 in view of the arcuate contour of the camming surface 290 which merely rides over the push-button without depressing it. The inclined shoulder 289 is positioned to permit the pawl 281 to turn through a sufficient angle to allow the valve actuating finger 273 to clear the end 288 of the pawl so that this finger moves to the broken line position illustrated in FIG. 3. As soon as the finger 273 moves beyond the end of the pawl, the spring 285 turns the pawl in a clockwise direction from the solid line position shown in FIG. 3 until the pawl again seats against the shoulder 287.

When the valve actuating arm 271 returns from the dotted line position shown in FIGS. 3 and 4, in a manner described more fully hereinafter, the finger 273 engages the end 288 of the pawl as shown in FIG. 4 but since the pawl is, at this time, resting on the shoulder 287, it is unable to pivot in a clockwise direction. As a result, the finger 273 forces the entire arm 282 to pivot about the pin 283a in a counterclockwise direction, thereby moving the arm from the broken line position illustrated in FIG. 4 to the solid line position. The described movement of the arm 282 is, of course, accompanied by corresponding movement of the push-button 291 which moves from the broken line position to the solid line position and actuates or opens the valve 254.

Considering next the structure for operating the valve 254, it will be observed that this structure includes the valve actuating arm 272 referred to above which is generally similar to the arm 271 and is provided with a valve actuating finger 272a at its free end. The arm 272 is connected through a linkage 292 to the arm 264 and, here again, the linkage 292 passes through a slot or notch formed in the base 267. A biasing spring 293 urges the arm 272 to pivot about the pin 269a in a clockwise direction as viewed in FIG. 2 in order to force the roller 262 into the path of movement of the rail section and, to this end, the spring is connected between the valve actuating finger 272a and the end of a channel beam 294 secured in fixed position upon the base 267. An adjustable stop screw 295 is threaded into a block 296 carried on the beam 294 for the purpose of limiting the clockwise movement of the arm 272. The valve actuating finger 272a is adapted to engage a pawl 299 which is identical to the pawl 281 described above but is inverted or is 180 degrees out of phase with respect to the latter pawl for a purpose which will become evident as the description proceeds. More particularly, the pawl 299 is mounted for pivotal movement upon the lower end of an arm 300 which, in turn, is free to pivot to a limited extent about a pivot pin 301 carried by the support structure 283. Counterclockwise movement of the pawl 299 as viewed in FIG. 2 is limited by engagement with an inclined shoulder 302 on the support arm, while clockwise movement is limited by engagement with a fixed shoulder 303. The pawl is normally urged to seat against the shoulder 303 by a biasing spring 304 connected between the outer end 305 of the pawl and the support base 267.

Figure 5:
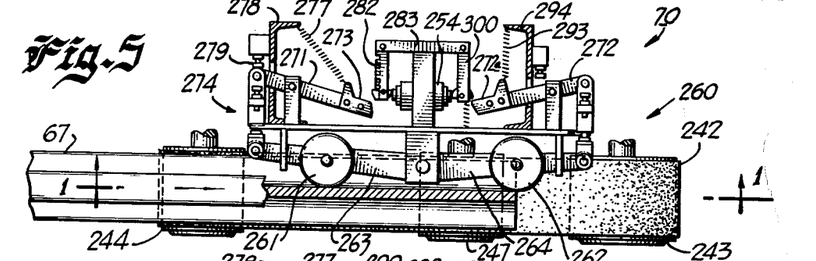
FIG. 5 is a view similar to FIG. 2 but shows the sensing mechanism in the condition where it is operated by the leading end of the rail section.
Figure 6:
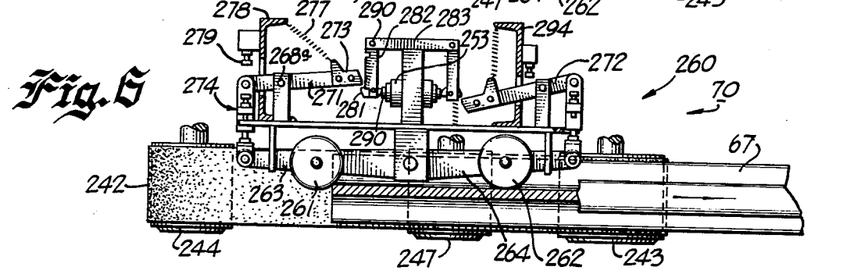
FIG. 6 is a view similar to FIG. 2 but shows the actuating mechanism when it is operated by the trailing end of the rail section.

When the leading end of the rail section reaches the position shown in FIG. 5, it engages the roller 262 to pivot the arm 264 about the pin 265 thus pivoting the valve actuating arm 272 in a counterclockwise direction about the pin 269a to move this arm from the position shown in FIG. 2 to that shown in FIG. 5. When the arm 272 is thus moved, the finger 272a engages the end 305 of the pawl 299 and pivots the arm 300 slightly in a clockwise direction about the pin 301 in the manner indicated above, thereby depressing a push-button 306 for operating the timed valve 254. When the valve actuating arm 272 is moved in a clockwise direction, the pawl 299 pivots in a counterclockwise direction and its arcuate camming surface 307 rides upon the outer end of the push-button 306 so that the latter push-button is not operated. The described counterclockwise movement of the pawl 299 is limited by engagement with the inclined shoulder 302 at which time the pawl has been moved sufficiently to permit the valve actuating finger 272a to pass.

Turning now to the operation of the valve actuating mechanism 260, it will be observed that in the absence of a rail section, the biasing springs 277 and 293 force both of the linkages 274 and 292 downwardly as viewed in FIG. 2 so that the rollers 261 and 262 are disposed well into the path of movement of the rail section. At this time, the valve actuating arms 271 and 272 are disposed in the positions illustrated in FIG. 2 awaiting the entry of the next rail section. When the leading end of the rail section enters the spot grinder it first engages the roller 261 to pivot the arm 263 in a clockwise direction about the pin 265, at the same time, pivoting the valve actuating arm 271 in a clockwise direction in order to move the finger 273 past the pawl 281. As described above, this action has no effect upon the valve 253 since the push-button 291 is not depressed when the pawl 281 pivots in a counterclockwise direction. The leading edge of the rail section continues to advance until it reaches the position shown in FIG. 5 where it encounters the roller 262 and pivots the arm 264 in a counterclockwise direction. When the arm 264 is thus pivoted, the valve actuating arm 272 turns about the pin 269a in a counterclockwise direction so that its valve actuating finger 272a engages the pawl 299 in order to pivot the arm 300 slightly about the pin 301 in a clockwise direction, thus depressing the push-button 306 and opening the valve 254. As indicated above, when the valve 254 is opened, fluid under pressure passes from the source 252 through the lines 255 and 256 to the piston and cylinder assemblies 250 and 251 with the result that the pressure operated rollers of both of the grinding heads 240 and 241 urge the abrasive belts 242 into engagement with the rail section. Thus the grinding heads 240 and 241 are rendered effective to grind a portion of the bottom of the rail base and a portion of the top running surface of the rail in a region near the leading end of the rail section. The pressure operated rollers remain in their actuated positions as long as the valve 254 remains open and, hence, the grinding action continues as the rail section advances to the right as viewed in FIGS. 1, 2, 5 and 6. At the end of a predetermined period which is selected to permit the grinding of a sufficient area to make certain that the electrodes of the welding apparatus will make good contact with the rail section during the welding operation, the valve 254 automatically closes, thus interrupting the flow of fluid under pressure to the piston and cylinder assemblies 250 and 251. As indicated above, the assemblies 250 and 251 are single acting devices and, hence, they are automatically returned to their non-actuated positions when the flow of air under pressure from the source is interrupted, thus moving the roller assemblies to their de-actuated positions. Thus, at the end of the predetermined period of operation of the valve 254, the grinding action terminates and the rail section continues to advance. When the trailing end of the rail section reaches the position shown in FIG. 6 where it moves out of engagement with the roller 261, the biasing spring 277 becomes effective to pivot the valve actuating arm 271 about the pin 268a in a counterclockwise direction, thus moving the finger 273 over the pawl 281 and pivoting the arm 282 about the pin 283a in a counterclockwise direction to depress the push-button 291 and open the valve 253. When the valve 253 is opened, fluid under pressure is again admitted from the source 252 to the piston and cylinder assemblies 250 and 251, with the result that the pressure operated rollers of the two grinding heads 240 and 241 again move the abrasive belt 242 into engagement with the rail section. At this time, the grinding heads 240 and 241 become effective to grind portions of the top running surface and the underside of the rail base near the trailing end of the rail section. This grinding continues until the timing period of the valve 253 expires at which time the latter valve closes automatically to interrupt the flow of air under pressure from the source 252 to the piston and cylinder assemblies 250 and 251 with the result that the pressure operated rollers of the two grinding heads 240 and 241 again return to their non-actuated positions.

When the predetermined period of operation of the valve 253 is completed, the rail section continues to advance until its trailing end leaves the roller 262. When this occurs the spring 293 becomes effective to pivot the valve actuating arm about the pin 269a in a clockwise direction until this arm returns to the position shown in FIG. 2. During this movement of the arm 272, the finger 272a pivots the pawl 299 in a counterclockwise direction but the pawl movement has no effect upon the valve 254 since the arcuate surface of the pawl rides along the push-button 306 without depressing it. At this point, of course, the sensing mechanism 260 has returned to its inoperative condition with the rollers 261 and 262 disposed in the path of movement of the next rail section awaiting the next cycle of operation. In view of the foregoing description, it will be recognized that the spot grinder is rendered effective to grind small portions of the rail section respectively located near its leading and trailing ends and the grinding is discontinued for the major portion of the cycle, thus avoiding excessive wear upon the abrasive belts 242.

While there has been illustrated a particular embodiment of the present invention, it should be understood that many modifications will be apparent to those skilled in the art and it is, therefore, intended in the appended claims to cover all such modifications falling within the true spirit and scope of the invention.

What is claimed as new and desired to be secured by Letters Patent of the United States is:

1. Apparatus for cleaning spaced apart portions located near its opposed ends of a rail section moving along its longitudinal axis, said apparatus comprising a fixedly positioned grinding device, control means for rendering said grinding device alternately effective and ineffective to grind the rail, means actuated by movement of the leading end of said rail section to the grinding device for actuating the control means so that the grinding device is rendered effective for a predetermined period to grind a portion of the rail section located near its leading edge, said predetermined period being much shorter than the time required for the rail section to move past the grinding device, and means actuated by movement of the trailing end of the rail section to the grinding device for actuating the control means in order to render the grinding device effective to grind a portion of the rail section near its trailing end.

2. Apparatus for grinding spaced apart portions located near the ends of a lengthwise moving rail section for the purpose of cleaning to facilitate an electric welding operation; said apparatus comprising a grinding device located in fixed position adjacent the path of movement of the rail section; fluid pressure operated means for rendering the grinding device alternately effective and ineffective to grind the rail section; and mechanism for operating the last named means in response to movement of the rail section so that the grinding device is effective to grind the rail section for a first predetermined period when a portion near the leading end of the rail section passes the grinding device and is also effective to grind the rail section for a second predetermined period spaced from the first period when a portion of the rail section near its trailing end passes the grinding device, said pressure operated means being effective to maintain the grinding device ineffective throughout the interval between said predetermined periods.

3. Apparatus for grinding spaced apart portions located near the ends of a lengthwise moving rail section for the purpose of cleaning to facilitate an electric welding operation; said apparatus comprising a grinding device located in fixed position adjacent the path of movement of the rail section; said grinding device including a grinding belt; means for driving said belt to move it over the top of the rail section in order to perform a grinding operation; at least one pressure roller movable from an actuated position wherein it is effective to force said belt against the rail section to a released position wherein the belt is ineffective to grind the rail section; fluid pressure operated means for moving the pressure roller between its actuated and released positions; a source for supplying fluid pressure to the last named means; means including control valving for controlling the delivery of fluid pressure from the source to the fluid pressure operated valving in response to movement of the rail section so that the fluid pressure operated means is effective to cause the roller to force the belt against the rail section for a first predetermined period when a portion near the leading end of the rail section passes the grinding device and is also effective to cause the roller to force the belt against the rail section for a second predetermined period spaced from the first period when a portion of the rail section near its trailing end passes the grinding device, said pressure operated means being effective to maintain the roller in released position throughout the interval between said predetermined periods.

4. Apparatus for grinding spaced apart portions located near the ends of a lengthwise moving rail section for the purpose of cleaning to facilitate an electric welding operation; said apparatus comprising a grinding device located in fixed position adjacent the path of movement of the rail section; said grinding device including a grinding belt, means for driving said belt to move it over the rail section in order to perform a grinding operation; at least one pressure roller movable from an actuated position wherein it is effective to force said belt against the rail section to a released position wherein the belt is ineffective to grind the rail section; fluid pressure operated means for moving the pressure roller between its actuated and released positions; and mechanism for rendering the fluid pressure operated means alternately effective and ineffective in response to movement of the rail section so that the roller forces the belt against the rail section for a first predetermined period when a portion of the rail section near its leading end passes the grinding device and also forces the belt against the rail section for a second predetermined period spaced from the first period when a portion of the rail section near its trailing end passes the grinding device, said fluid pressure operated means being effective to maintain the roller in released position throughout the interval between said predetermined periods.

5. Apparatus for grinding spaced apart portions located near the ends of a lengthwise moving rail section for the purpose of cleaning to facilitate an electric welding operation; said apparatus comprising a grinding device located in fixed position adjacent the path of movement of the rail section; said grinding device including a grinding belt, means for driving said belt to move it over the rail section in order to perform a grinding operation; at least one pressure roller movable from an actuated position wherein it is effective to force said belt against a rail section to a released position wherein the belt is ineffective to grind the rail section; fluid pressure operated means for moving the pressure roller between its actuated and released positions; a source for supplying fluid pressure to the last named means, means including first and second valves for controlling the delivery of fluid pressure from the source to the fluid pressure operated means; and mechanism for controlling the operation of the valves in response to movement of the rail sections, said mechanism including first and second pivotally mounted supports each carrying a member disposed in the path of movement of the rail sections with the members being spaced apart in the direction of travel of the rail section, first and second linkages each movable between first and second operating positions, said first and second linkages being operably connected to said first and second supports, respectively, said first linkage being moved from its first position to its second position when the member on the first support is engaged by the leading end of the rail section as the latter enters the grinding device and said first linkage being returned to its first position as the trailing end of the rail section moves out of engagement with the member on the first support when leaving the grinding device, a first valve operating element operated by the movement of the first linkage and acting upon the first valve, said second linkage being moved from its first position to its second position when the member on the second support is engaged by the leading end of the rail section as the latter enters the grinding device and said second linkage being returned to its first position as the trailing end of the rail section moves out of engagement with the member on the second support when leaving the grinding device, a second valve operating element operated by the movement of the second linkage and acting upon the second valve, one of said valves being opened to admit fluid pressure from the source to the fluid pressure operated means when its associated linkage is moved when the leading end of the rail section enters the grinding device, thereby causing the pressure roller to force the grinding belt against the top of the rail section in order to clean a portion of the rail section near its leading end, and the other of said valves being opened to admit fluid pressure from the source to the fluid pressure operated means when its associated linkage is moved in response to movement of the trailing end of the rail section out of the grinding device, thereby causing the pressure roller to force the belt against the top of the rail section in order to clean a portion of the rail section near its trailing end.

6. Apparatus for grinding spaced apart portions near the ends of a lengthwise moving rail section for the purpose of cleaning to facilitate an electric welding operation; said apparatus comprising a grinding device located in fixed position adjacent the path of movement of the rail section; said grinding device including a grinding belt, means for driving said belt to move it over the top of the rail section in order to perform a grinding operation; at least one pressure roller movable from an actuated position wherein it is effective to force said belt against a rail section to a released position wherein the belt is ineffective to grind the rail section; fluid pressure operated means for moving the pressure roller between its actuated and released positions; a source for supplying fluid pressure to the last named means; means including first and second valves for controlling the delivery of fluid pressure from the source to the fluid pressure operated means; and mechanism for controlling the operation of the valves in response to movement of the rail sections, said mechanism including first and second pivotally mounted supports each carrying a member disposed in the path of movement of the rail sections with the members being spaced apart in the direction of travel of the rail section, first and second linkages each movable between first and second operating positions, said first and second linkages being operably connected to said first and second supports, respectively, said first linkage being moved from its first position to its second position when the member on the first support is engaged by the leading end of the rail section as the latter enters the grinding device and said first linkage being returned to its first position as the trailing end of the rail section moves out of engagement with the member on the first support when leaving the grinding device, a first valve operating element operated by the first linkage and acting upon the first valve, said second linkage being moved from its first position to its second position when the member on the second support is engaged by the leading end of the rail section as the latter enters the grinding device and said second linkage being returned to its first position as the trailing end of the rail section moves out of engagement with the member on the second support when leaving the grinding device, a second valve operating element operated by the second linkage and acting upon the second valve, the first valve being opened to admit fluid pressure from the source to the fluid pressure operated means when said first linkage is moved by engagement of the member on the first support with the leading end of the rail section, thereby causing the pressure roller to force the grinding belt against the top of the rail section in order to clean a portion of the rail section near its leading end, and the second valve being opened to admit fluid pressure from the source to the fluid pressure operated means when said second linkage is moved by disengagement of the member on the second arm from the trailing end of the rail section, thereby causing the pressure roller to force the belt against the top of the rail section in order to clean a portion of the rail section near its trailing end.

7. Apparatus for grinding spaced apart portions located near the ends of a lengthwise moving rail section for the purpose of cleaning to facilitate an electric welding operation; said apparatus comprising a grinding device located in fixed position adjacent the path of movement of the rail section; said grinding device including a grinding belt, means for driving said belt to move it over the top of the rail section in order to perform a grinding operation; at least one pressure roller movable from an actuated position wherein it is effective to force said belt against a rail section to a released position wherein the belt is ineffective to grind the rail section; fluid pressure operated means for moving the pressure roller between its actuated and released positions; a source for supplying fluid pressure to the last named means; means including first and second valves for controlling the delivery of fluid pressure from the source to the fluid pressure operated means; and mechanism for controlling the operation of the valves in response to movement of the rail sections; said mechanism including first and second pivotally mounted supports each carrying a roller disposed in the path of movement of the rail sections with the rollers being spaced apart in the direction of travel of the rail section, first and second linkages operably connected to said first and second supports, respectively, and respectively including first and second pawl operating arms, springs normally biasing each of said pawl operating arms to a first predetermined position, said first pawl operating arm being moved from its first position to a second position when the roller on the first support is engaged by the leading end of the rail section as the latter enters the grinding device and said first arm being returned to its first position as the trailing end of the rail section moves out of engagement with the roller on the first support when leaving the grinding device, a first pivotally mounted pawl having a portion disposed in the path of movement of the first operating arm and including a cam portion acting upon the first valve, the cam portion being constructed so that pivotal movement of the first pawl in one direction in response to movement of the first operating arm from the first position to the second position has no effect upon the first valve while return movement of the first operating arm from the second position to the first position is effective to open the first valve in order to admit fluid pressure from the source to the fluid pressure operated means, thereby causing the pressure roller to force the grinding belt against the top of the rail section in order to clean a portion of the rail section near its trailing end, said first valve being of the type which remains open for a predetermined period following its actuation and then closes automatically, said second pawl operating arm being moved from its first position to a second position when the roller arm on the second support is engaged by the leading end of the rail section as the latter enters the grinding device and said second arm being returned to its first position as the trailing end of the rail section moves out of engagement with the roller on the second support when leaving the grinding device, a second pivotally mounted pawl having a portion disposed in the path of movement of the second operating arm so that the pawl is pivoted as the latter arm moves between its two positions, said second pawl including a cam portion acting upon said second valve and so constructed that pivotal movement of the pawl in one direction in response to movement of the second operating arm from its first position to its second position opens the second valve to admit fluid pressure from the source to the fluid pressure operated means, thereby causing the pressure roller to force the grinding belt against the top of the rail section in order to clean a portion of the rail section near its leading end, while return movement of the second arm from its second position to its first position has no effect upon the second valve, said second valve being of the type which remains open for a predetermined interval following its actuation and then closes automatically, the predetermined interval being much shorter than the time required for the rail section to move past the grinding device so that only relatively short sections near the opposed ends of the rail section are ground by the belt.

8. Apparatus for cleaning spaced apart portions located near the opposed ends of a rail section, said apparatus comprising a grinding device, the rail section and the grinding device being relatively movable with respect to each other, and means operated automatically in response to said relative movement for first rendering said grinding device effective to grind the rail for a first interval, for then rendering the grinding device ineffective for a period during which a major portion of the relative movement between the rail section and the grinding device occurs, and for then rendering the grinding device effective for a second interval, said intervals being much shorter than said period so that the last named means is effective to cause the grinding device to grind only relatively small portions of the rail section located near its opposed ends, said first and second intervals each being of fixed time duration.

9. Apparatus for cleaning spaced apart portions located near the opposed ends of a moving rail section, said apparatus comprising a fixedly positioned grinding device adjacent the path of movement of the rail section, and means operated in response to the rail movement for first rendering said grinding device effective to grind the rail for a first interval, for then rendering the grinding device ineffective for a period during which a major portion of the relative movement between the rail section and the grinding device occurs, and for then rendering the grinding device effective for a second interval, said intervals being much shorter than said period so that the last named means is effective to cause the grinding device to grind only relatively small portions of the rail section located near its opposed ends, said first and second intervals each being of fixed time duration.

10. Apparatus for cleaning spaced apart portions of the top of a rail section, said apparatus comprising a grinding device including a grinding belt acting upon the top of the rail section, the rail section and the grinding device being relatively movable with respect to each other, and means operated in response to said relative movement for first rendering said grinding belt effective to grind the rail for a first interval, for then rendering the grinding device ineffective for a period during which a major portion of the relative movement between the rail section and the grinding device occurs, and for then rendering the grinding device effective for a second interval, said intervals being much shorter than said period so that the last named means is effective to cause the grinding belt to grind only relatively small spaced apart top portions of the rail section respectively located near its opposed ends.

11. Apparatus for cleaning spaced apart portions of the top of a moving rail section, said portions being respectively located near the opposed ends of the rail sections, said apparatus comprising a fixedly positioned grinding device located adjacent the path of movement of the rail section and including a grinding belt acting upon the top of the rail section, and means operated in response to the movement of the rail section for first rendering said grinding belt effective to grind the rail for a first interval, for then rendering the grinding device ineffective for a period during which a major portion of the relative movement between the rail section and the grinding device occurs, and for then rendering the grinding device effective for a second interval, said intervals being much shorter than said period so that the last named means is effective to cause the grinding belt to grind only relatively small spaced apart top portions of the rail section respectively located near its opposed ends.

12. In a method of cleaning spaced apart electrode engaging regions located near the opposed ends of a rail section in order to facilitate an electric welding operation, the steps of passing said rail section through a fixed grinding station including a grinding device, grinding only the top running surface and the underside of the base of the rail section for a predetermined fixed interval when the leading end of the rail section is advanced to and is passing through the grinding station, ceasing the grinding for a selected fixed time following the expiration of said predetermined interval while the rail section is passing through the grinding station, and again grinding only the top running surface and the underside of the base of the rail section for a predetermined fixed period following the expiration of said selected time and while the trailing end of the rail section is passing through the grinding station, said selected time being sufficient to permit a major portion of the rail section to move through the grinding station so that portions of the rail section located near its trailing end are ground during said predetermined period.

13. In a method of cleaning spaced apart electrode engaging regions located near the opposed ends of a rail section to facilitate an electric welding operation, the steps of passing said rail section through a fixed grinding station including a grinding device, grinding said rail section for a predetermined fixed interval when the leading end of the rail section is advanced to and is passing through the grinding station, ceasing the grinding of the rail section for a selected time following the expiration of said predetermined interval and while the rail section passes through the grinding station, and again grinding the rail section for a predetermined fixed period following the expiration of said selected time and while the trailing end of the rail section is passing through the grinding station, said selected time being sufficient to permit a major portion of the rail section to move through the grinding station so that portions of the rail section located near its trailing end are ground during said predetermined period.

14. In a method of cleaning a rail section by a grinding device acting on spaced electrode engaging portions located near the opposed ends of the rail section in order to facilitate an electric welding operation, the steps of relatively moving the rail section and the grinding device, and grinding the rail section only during fixed spaced apart time intervals during the relative movement in order to grind spaced apart longitudinally extending surface portions of the rail section respectively located near its opposed ends.

15. In a method of cleaning a rail section by a grinding device acting on spaced electrode engaging portions located near the opposed ends of the rail section in order to facilitate an electric welding operation, the steps of moving the rail section past a fixed grinding station including the grinding device, and grinding said rail section only during fixed spaced apart time intervals during the movement of the rail section in order to grind spaced apart longitudinally extending surface portions of the rail section respectively located near its opposed ends.

16. Apparatus for cleaning spaced apart portions located near its opposed ends of a rail section moving along its longitudinal axis, said apparatus comprising a grinding device past which the rail section is moved, and control means for rendering said grinding device alternately effective and ineffective to grind the rail in response to movement of the rail section, said control means including means to render the grinding device effective for a first period to grind a small predetermined area of the periphery of the rail section located near its leading edge, means for rendering the grinding device effective for a second period to grind a small predetermined area of the periphery of the rail section located near its trailing end, and means for rendering the grinding device ineffective to grind the rail section for a third period between said first and second periods, said first and second periods being much shorter than said third so that a major portion of the rail section passes through the grinding device without being ground.

17. The apparatus defined by claim 16 wherein the means to render the grinding device effective for said first period is actuated by the movement of the leading end of the rail section to a predetermined position adjacent the grinding device.

18. The apparatus defined by claim 16 wherein the means for rendering the grinding device effective for said second period is actuated in response to movement of the trailing end of the rail section to a predetermined position adjacent the grinding device.

19. The apparatus defined by claim 16 wherein the means to render the grinding device effective for said first period is actuated by movement of the leading end of the rail section to a predetermined position adjacent the grinding device and wherein the means for rendering the grinding device effective for said second period is actuated by movement of the trailing end of the rail section to said predetermined position.

20. The apparatus defined by claim 17 wherein the first and second periods are of fixed predetermined duration.

21. Apparatus for cleaning spaced apart portions located near the opposed ends of a rail section, said apparatus comprising an abrasive cleaning device, the rail section and the cleaning device being relatively movable with respect to each other, and means operated automatically in synchronism with said relative movement for first rendering said cleaning device effective to clean the rail for a first interval, for then rendering the cleaning device ineffective for a period during which a major portion of the relative movement between the rail section and the cleaning device occurs for at least a portion of said period, and for then rendering the cleaning device effective for a second interval, said intervals being much shorter than said period so that the last named means is effective to cause the cleaning device to clean only relatively small portions of the rail section located near its opposed ends.

22. The apparatus defined by claim 21 wherein said cleaning device is a grinding apparatus acting upon the rail section to effect the cleaning and effective to cease the grinding in order to terminate the cleaning.

23. Apparatus for cleaning spaced apart portions located near the opposed ends of a moving rail section, said apparatus comprising a fixedly positioned cleaning device adjacent the path of movement of the rail section, and means operated in synchronism with the rail movement for first rendering said cleaning device effective to clean the rail for a first interval, for then rendering the cleaning device ineffective for a period during which a major portion of the relative movement between the rail section and the cleaning device occurs for at least a portion of said period, and for then rendering the cleaning device effective for a second interval, said intervals being much shorter than said period so that the last named means is effective to cause the cleaning device to clean only relatively small portions of the rail section located near its opposed ends.

24. The apparatus defined by claim 23 wherein said cleaning device is a grinding apparatus engageable with the rail section to effect the cleaning and disengageable from the rail section to terminate the cleaning.

25. In a method of cleaning a rail section by using a cleaning device acting on spaced electrode receiving portions respectively located near the opposed ends of the rail section in order to facilitate an electric welding operation, the steps of relatively moving said rail section and said cleaning device, cleaning only the top running surface and the underside of the base of the rail section near one end of the rail section for a predetermined fixed interval during said relative movement, creasing the cleaning of the rail section for a selected time following the expiration of said predetermined interval and during said relative movement, and again cleaning only the top running surface and the underside of the base of the rail section for a predetermined fixed period and during said relative movement and following the expiration of said selected time, said selected time being sufficient to prevent the major portion of the rail section from being cleaned by the cleaning device, whereby portions of the rail section located near the other end are cleaned during said predetermined period.

26. The method defined by claim 25 wherein both of the cleaning steps are carried out by grinding said rail section with a grinding device and wherein the step of ceasing the cleaning is carried out by disengaging the grinding device from the rail section.

27. In a method of cleaning a rail section by using a cleaning device acting on spaced electrode engaging portions respectively located near the opposed ends of the rail section in order to facilitate an electric welding operation, the steps of relatively moving said rail section and said cleaning device, cleaning a portion of the rail section located near one end thereof for a predetermined fixed interval during said relative movement, ceasing the cleaning for a selected time following the expiration of said predetermined interval during which a major portion of said relative movement occurs for at least a portion of said selected time, and again cleaning a portion of the rail section located near its other end for a predetermined fixed period during said relative movement and following the expiration of said selected time, said selected time being at least sufficient to prevent cleaning of a major portion of the rail section.

28. The method defined by claim 27 wherein both of the cleaning steps are carried out by grinding said rail section with a grinding device and wherein the step of ceasing the cleaning is carried out by disengaging the grinding device from the rail section.

29. Apparatus for cleaning spaced apart portions located near the opposed ends of a rail section, said apparatus comprising an abrasive cleaning device, the rail section and the cleaning device being relatively movable with respect to each other, and means operated automatically in synchronism with said relative movement for first rendering said cleaning device effective to clean a first predetermined relatively small area of the rail located near one of its ends, for then rendering the cleaning device ineffective to clean the rail for a period at least great enough to permit a major portion of the relative movement between the rail and the cleaning device, and for then rendering the cleaning device effective to clean a second relatively small area of the rail located near the other end thereof.

30. The apparatus defined by claim 29 wherein said cleaning device is a grinding apparatus engageable with the rail section to effect the cleaning and disengageable from the rail section to terminate the cleaning.

31. Apparatus for cleaning spaced apart portions located near the opposed ends of a moving rail section, said apparatus comprising a fixedly positioned cleaning device adjacent the path of movement of the rail section, and means operated in synchronism with the rail movement for first rendering said cleaning device effective to clean a first predetermined relatively small area of the rail located near one of its ends, for then rendering the cleaning device ineffective to clean the rail for a period during which a major portion of the movement of the rail past the cleaning device occurs, and for then rendering the cleaning device effective to clean a second small area of the rail located near the other end thereof.

32. The apparatus defined by claim 31 wherein said cleaning device is a grinding apparatus acting upon the rail section to effect the cleaning and effective to cease grinding the rail section in order to terminate the cleaning.

References Cited in the file of this patent

UNITED STATES PATENTS

| | | |
|---|---|---|
| 1,988,577 | Scrimgeour | Jan. 22, 1935 |
| 2,782,567 | Opalick | Feb. 26, 1957 |
| 2,783,593 | Hercik | Mar. 5, 1957 |
| 2,859,567 | Berry | Nov. 11, 1958 |
| 3,049,839 | Smith | Aug. 21, 1962 |

UNITED STATES PATENT OFFICE
CERTIFICATE OF CORRECTION

Patent No. 3,129,535                                      April 21, 1964

Robert E. Slattery

It is hereby certified that error appears in the above numbered patent requiring correction and that the said Letters Patent should read as corrected below.

Column 3, line 30, for "bolt" read -- belt --; column 8, line 41, after "operated" insert -- means; and mechanism for opening and closing the --; column 13, line 47, after "third" insert -- period --; column 14, line 46, for "creasing" read -- ceasing --.

Signed and sealed this 10th day of November 1964.

(SEAL)
Attest:

ERNEST W. SWIDER                                    EDWARD J. BRENNER
Attesting Officer                                          Commissioner of Patents